US006596210B2

(12) United States Patent
Rieder et al.

(10) Patent No.: US 6,596,210 B2
(45) Date of Patent: Jul. 22, 2003

(54) PROCESS OF TREATING FIBERS

(75) Inventors: Klaus-Alexander Rieder, Salem, MA (US); Neal S. Berke, North Chelmsford, MA (US); Stephen J. Fyler, Fremont, NH (US); Michael Macklin, Westford, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 59 days.

(21) Appl. No.: 09/923,222

(22) Filed: Aug. 6, 2001

(65) Prior Publication Data

US 2001/0051266 A1 Dec. 13, 2001

Related U.S. Application Data

(60) Division of application No. 09/609,148, filed on Mar. 30, 2000, now Pat. No. 6,503,625, which is a continuation-in-part of application No. 09/416,012, filed on Oct. 8, 1999, now Pat. No. 6,197,423.

(51) Int. Cl.[7] .......................... D01D 10/00; D02G 3/22
(52) U.S. Cl. .......................... 264/138; 28/219; 264/280
(58) Field of Search ............................ 264/138, 280; 28/219

(56) References Cited

U.S. PATENT DOCUMENTS

| 3,716,386 A | 2/1973 | Kempster et al. |
| 3,953,953 A | 5/1976 | Marsdon |
| 4,121,943 A | 10/1978 | Akazawa et al. |
| 4,224,377 A | 9/1980 | Moens |
| 4,297,409 A | 10/1981 | Hannaht |
| 4,297,414 A | 10/1981 | Matsumoto |
| 4,314,853 A | 2/1982 | Moens |
| 4,414,030 A | 11/1983 | Restrepo |
| 4,451,534 A | 5/1984 | Akagi et al. |
| 4,522,884 A | 6/1985 | Brody |
| 4,524,101 A | 6/1985 | Eickman et al. |
| 4,565,840 A | 1/1986 | Kobayashi et al. |
| 4,764,426 A | 8/1988 | Nakamura et al. |
| 4,792,489 A | 12/1988 | Kakiuchi et al. |
| 5,298,071 A | 3/1994 | Vondran |
| 5,298,313 A | 3/1994 | Noland |
| 5,399,195 A | 3/1995 | Hansen et al. |
| 5,753,368 A | 5/1998 | Berke et al. |
| 5,807,458 A | 9/1998 | Sanders et al. |
| 5,882,322 A | 3/1999 | Kim et al. |
| 5,897,928 A | 4/1999 | Sanders et al. |
| 5,985,449 A | 11/1999 | Dill |
| 5,993,537 A | 11/1999 | Trottier et al. |
| 6,045,911 A | 4/2000 | Legrand et al. |
| 6,048,613 A | 4/2000 | Yamakawa et al. |

FOREIGN PATENT DOCUMENTS

| JP | 60-186448 A | 9/1985 |
| WO | WO 99/36640 A1 | 7/1999 |
| WO | WO 99/46214 A1 | 9/1999 |

OTHER PUBLICATIONS

State–of–the–Art Report on Fiber Reinforced Concrete, ACI Journal, Nov. 1973, pp. 729–744.
Synthetic Fiber For Industry, Whiting Company, 1990, pp. 1–6.

*Primary Examiner*—Leo B. Tentoni
(74) *Attorney, Agent, or Firm*—Craig K. Leon, Esq.; William L. Baker, Esq.

(57) ABSTRACT

Preferred methods for manufacturing such fibers involve subjecting synthetic polymer fibers to compressive forces sufficient to achieve flattening and surface micro-diastrophism without substantially shredding and abrading the fibers.

8 Claims, 15 Drawing Sheets

PROCESS OF TREATING FIBERS

This is a division of application Ser. No. 09/609,148, filed Jun. 30, 2000, now U.S. Pat. No. 6,503,625.

This is a continuation-in-part of U.S. patent application Ser. No. 09/416,012 filed Oct. 8, 1999, now U.S. Pat. No. 6,197,423 pending.

FIELD OF THE INVENTION

This invention relates to fibers useful for reinforcing matrix materials, and more particularly to fibers having mechanically-deformed morphologies useful for enhanced performance in matrix materials such as asphalt, rubber, plastic, or in such matrix materials such as ready-mix concrete, shotcrete, bituminous concrete, gypsum compositions, or other hydratable cementitious compositions; to matrix compositions containing such fibers; and to methods for treating fibers and for modifying matrix materials.

BACKGROUND OF THE INVENTION

Although the fibers of the present invention are believed suitable for reinforcing a number of matrix materials, such as adhesives, asphalt, composites, plastic, rubber, etc. and structures made therefrom, they are primarily intended for reinforcing hydratable cementitious compositions such as ready-mix concrete, precast concrete, masonry concrete, shotcrete, bituminous concrete, gypsum compositions, gypsum-and/or Portland cement-based fireproofing compositions, and other hydratable cementitious compositions. A major purpose of the fibers of the present invention is reinforcing concrete (e.g., ready-mix, shotcrete, etc.) and structures made from these. The task of reinforcing matrix materials such as these poses one of the greatest challenge for designers of reinforcing fibers.

Concrete is made using a hydratable cement binder, a fine aggregate (e.g., sand), and a coarse aggregate (e.g., small stones, gravel), and is consequently a brittle material. If a concrete structure is subjected to stresses that exceed its maximum tensile strength, then cracks can be initiated and propagated in the concrete. The ability of a concrete structure to resist crack initiation and crack propagation can be understood with reference to the "strength" and "fracture toughness" of the fibers.

Concrete "strength" relates to the ability of a cement or concrete structure to resist crack initiation. In other words, concrete strength is proportional to the maximum load sustainable by the structure without cracking, and is a measurement of the minimum load or stress (e.g., the "critical stress intensity factor") required to initiate cracking in that structure.

On the other hand, "fracture toughness" relates to the specific "fracture energy" of a cement or concrete structure. This concept refers to the ability of the structure to resist propagation—or widening—of an existing crack in the structure. This toughness property is proportional to the energy required to propagate or widen the crack (or cracks). This property can be determined by simultaneously measuring the load required to deform or "deflect" a fiber-containing concrete (FRC) sample at an opened crack and also measuring the amount or extent of deflection. The fracture toughness is therefore determined by dividing the area under a load deflection curve (generated from plotting the load against deflection of the FRC specimen) by its cross-sectional area.

In the cement and concrete arts, fibers have been designed to increase the strength and fracture toughness of cement or concrete. Numerous fiber materials can be used for these purposes, such as steel, synthetic polymers (e.g., polyolefins), carbon, nylon, aramid, and glass. The use of steel fibers for reinforcing concrete structures remains popular due to the inherent strength of the material. However, one of the concerns in steel fiber product design is to increase their "pull out" resistance because this increases the ability of the fiber to defeat crack propagation. In this connection, U.S. Pat. No. 3,953,953 of Marsden disclosed fibers having "J"-shaped ends for resisting pull-out from concrete. However, stiff fibers having physical deformities may cause entanglement problems that render the fibers difficult to handle and to disperse uniformly within a wet concrete mix. More recent designs, involving the use of "crimped" or "wave-like" polymer fibers, may have similar complications, depending on the stiffness of the fiber material employed.

U.S. Pat. No. 4,414,030 of Restrepo disclosed the use of microfibrillated polyolefin filaments that are oriented in all spatial directions by subjecting fibrillated ribbons to air, thereby spreading out the separate fibers, and then feeding these separated fibers into a mortar mixing machine fitted with a high-speed propeller to blend the mortar components and fibrous materials together. The mechanical shredding action which takes place in the mixing operation causes the ribbons to become further fibrillated, such that the ribbon fibrils are broken apart into individual filaments having a branched structure with microfibrils outwardly projecting along their length. The projected microfibrils are somewhat curled in shape and perform as anchoring elements or "hooks" within the cement hardened matrix. It is generally believed that side branches or "hooks" can act to resist fiber dislodgment or pull-out from the cement matrix and present enlarged surface area for anchoring within concrete. The physical branched fiber structure would appear to create entanglement problems that would render handling and dispersion within a wet concrete mix somewhat difficult to achieve.

U.S. Pat. No. 5,753,368 of Berke et al. taught fibers having a glycol ether-based coating for enhancing bond strength of the fibers within concrete. Berke et al. further taught that the fibers could be bundled using mechanical or chemical means, and that the fibers could be introduced into a cement composition using packaging technology to facilitate mixing and dispersion within concrete. This technology may be applied to varieties of fibers and shapes to enhance pull out resistance while facilitating uniform dispersion within the concrete mix.

U.S. Pat. No. 5,298,071 of Vondran discussed the problem of achieving a uniform dispersal of fibers within a wet cement mix. Vondran noted that fibers were typically added to the mixer with the cement, sand, aggregate, other admixtures, and water. His approach was to add fiber precursors (e.g., steel fibers and polyolefin in the form of extruded monofilament or fibrillated sheet fiber) and cement clinker to a ball mill grinder and to obtain a hydratable mixture comprising interground fibers in a dry hydratable cement powder that could then be used for making the concrete structure.

It is readily observed that Vondran's clinker/fiber-intergrinding method (hereinafter the "Vondran method") purports to achieve quick fiber wetting and uniform dispersion without the balling and clumping found when adding the fiber components separately into concrete. The present inventors, however, observe that the Vondran method teaches that "fiber precursors" are combined with cement clinker particles into a ball mill cement grinder, and that this process provides fibers that are "attenuated, roughened and abraded by the action of the clinker particles and the grinding elements on the fiber" (See U.S. Pat. No. 5,298,071 at column 2, lines 58–66). This process purportedly results in improved mechanical bonding between the cement and fibers.

In the present invention, however, the inventors seek to improve the pull-out resistance of fibers from concrete while avoiding the kinds of mechanical or physical fiber attributes that might otherwise impede the ability of the fiber to be introduced into, and uniformly dispersed within, the concrete mix. The present inventors believe that the clinker intergrinding process of Vondran results in cement particles being ground into, and embedded in, the fiber surface. Moreover, the deep-abrading action of the cement clinker may be undesirable because the fibers will tend to clump during humid conditions (e.g., storage, shipment) due to the hydrating cement particles. Furthermore, fibers can not be interground with clinker at high volumes using ball mill machinery in an clinker-intergrinding process because the fibers would potentially clog the classifier unit used in such mills for separating ground cement particles from the grinding operation. The present inventors have also discovered that fibers interground in ball mill operations using clinker are severely abraded, and, in effect, are shredded to the point at which their mechanical integrity, for purposes of reinforcing concrete, is defeated. Such clinker-interground fibers, whether by abrasion and/or impact of clinker material, lose mechanical resistance to pull-out from concrete (i.e., fracture toughness) because the fiber bodies and ends are shredded or devastated by the clinker/fiber intergrinding operation.

The terms "shredded" or "shredding" are used herein to refer to the tearing-apart of the fiber body into smaller elongated pieces. The concept of "shredding" as used herein is not equated herein with the concept of "fibrillation". The concept of fibrillation may be seen to occur where a multifilament fiber, comprised of two or more strands or fibrils are adhered or bonded together, is separated into its component strands or fibrils. On the other hand, "shredding" is defined for present purposes as the act of breaking a fiber down (whether monofilament or multifilament) into pieces smaller than the constituent strands or fibrils.

In view of the disadvantages of the prior art as discussed above, the present inventors believe that a novel fiber for reinforcing matrix materials, and in particular hydratable cementitious materials such as concrete and shotcrete, are needed. Also needed are novel methods for making such fibers and for modifying such matrix materials.

SUMMARY OF THE INVENTION

In contrast to the above-described prior art fibers and methods for manufacturing reinforcing fibers, the present invention provides fibers which are micro-mechanically-deformed such that the fibers are flattened and have surface deformations for improved contact with the matrix material. Fibers of the invention are mechanically-flattened to provide macro-level deformations in terms of varying width and/or thickness dimensions within fiber lengths, but are also "diastrophically" deformed to provide micro-level deformations (e.g., microscopic material displacements) on the fiber surface. This is achieved while avoiding the obliterative clinker intergrinding process of the prior art.

The term "diastrophic," as used herein is defined in Webster's Third New International Dictionary (Merriam-Webster Unabridged Dictionary, Springfield, Mass.) as follows: an adjective "of, having reference to, or caused by diastrophism." The term "diastrophism," in turn, is defined in this Webster's dictionary as "the process of deformation that produces in earth's crust its continents and ocean basins, plateaus and mountains, folds of strata, and faults-."

The present application, therefore, borrows geological terminology in describing "micro-diastrophic" synthetic fibers which have a microscopic surface "diastrophism". After application of the flattening processes of the invention, a number of physical deformations or material displacements caused or induced in the fibers can be seen under the microscope to resemble geological morphologies or phenomena. For example, the microscopically viewed surfaces of the treated fibers have irregularly and randomly elevated portions or ridges resembling islands, continents, plateaus, and mountains; and there can also be detected equally random folds of strata, faults (or fissures), and other physical displacements of fiber material. These microscopic deformation irregularities appear randomly on the surface of a given fiber, as well as from fiber to fiber.

Thus, the term "micro-diastrophic" is appropriate for describing the micro-level deformations or physical displacements of exemplary fibers of the present invention. The term "micro-diastrophism" also appears to describe the three-dimensional morphological changes achieved by the novel methods of the invention. These morphological changes may be achieved by subjecting synthetic polymer material (preferably a polypropylene, polyethylene, or mixture thereof) to a compressive force. An exemplary compressive force may be achieved by using at least one roller, and preferably opposed rollers to compress the fibers to induce irregular and random microscopic surface deformations that are described herein as diastrophic; this process is very different from superficially embossing or crimping fibers. Alternatively, though less preferably, the effect may be achieved by using a ball mill (without the use of cement clinker as taught by Vondran et al). The stress forces on the fibers should be sufficient to flatten the fibers in a manner to increase and vary (within the length of the fiber) the fiber width dimension, thickness dimension, or both; and to cause or induce micro-diastrophism in the fiber surface as mentioned above. The micro-diastrophism in the fiber surface causes an increase in the total fiber surface area that can be placed into contact with the matrix material. The micro-diastrophic surface deformities should be achieved without substantially shredding the elongated body or end portions of the fibers (e.g., without cement particles being embedded in, with attendant abrasion of, the fiber surface), although a small amount of fibrillation or shredding at the extreme fiber ends may be tolerated within the spirit of the present invention.

One advantage of the fibers of the invention is their ability to provide strong bonds with the matrix material (e.g., concrete). This is believed to arise from the fibers having a variable width and/or thickness dimension(s), and enhanced bonding surface due to micro-diastrophism in the fiber surface. These advantages are provided while avoiding a substantial increase in fiber-to-fiber entanglement or clumping which would otherwise be expected to arise during or after mixing into the matrix material. Another advantage of the invention is that, in the absence of using the prior art clinker-intergrinding method, the fibers and methods of the present invention are substantially free of embedded cement/clinker particles and the abrasive and obliterative shredding caused by the prior art clinker-intergrinding operation.

Thus, the present invention provides high performance fibers and methods for reinforcing matrix materials against cracks without entailing the problems of prior art reinforcing fibers. Exemplary fibers of the invention comprise a plurality of mechanically-flattened fibers having generally elongate bodies, opposed body ends defining a fiber length, said fiber bodies have varied width and/or thickness dimensions and having micro-diastrophic surface deformities. Matrix materials and structures comprising such fibers are also disclosed and claimed. An exemplary method of the present invention for manufacturing fibers comprises providing a plurality of synthetic polymer fibers, and mechanically flattening these fibers to the extent that the fibers, after said mechanical flattening, have a varied width and or thickness dimension and micro-diastrophism.

Further exemplary fibers of the invention can be made using the mechanically-flattening processes of the invention to induce macro-level deformities with or without the "micro-diastrophic" (microscopic) features described above. For example, the mechanical flattening of intertwined fibers (e.g., rope) or braided fibers (e.g., interwoven into rope or cables) has been discovered by the present inventors to create physical impressions in the fiber bodies of having being intertwined with at least one other fiber strand and flattened against the fiber body. It is believed by the present inventors that flattening intertwined or braided fiber strands, and then cutting the flattened fibers, can provide a plurality of fibers having a relatively uniform flexibility enhancement from fiber to fiber in the resulting plurality of fibers. This fiber flexibility enhancement is believed to contribute significantly to increasing the ease of dispersing the treated fibers in a matrix composition, particularly such as concrete and masonry.

Accordingly, other exemplary fiber embodiments of the invention comprise one or more synthetic polymers (e.g., polypropylene, polyethylene, styrene, etc.), metals (e.g., steel), or mixture thereof, having an average length of 5–100 mm and more preferably 5–75 mm, an average fiber width of 0.5–8.0 mm, said fibers having first and second opposed ends defining therebetween an intermediate elongate fiber body having portions thereof bearing physical impression of at least one other fiber intertwined or braided and flattened against the elongate fiber body portion. Optionally, but preferably, the fibers have the micro-diastrophic surface as previously described above. The effect, however, of mechanically flattening the fiber strands while in an intertwined or interwoven state, such as between opposed rollers, creates a macro-level deformation ("macro" because visibly observable by the unaided human eye). The physical impression of fiber intertwinement or interweaving during flattening can be observed as ridges (or projections) and/or as grooves (or depressions) having diagonal orientations with respect to the length of the fiber bodies. If the degree of intertwinement or interweaving is relatively uniform (in terms of turns or weavings per lineal foot of fiber), the angle of orientation of such ridges or grooves with respect to the length of the fibers will be seen to be fairly consistent from fiber to fiber.

More significantly, in contrast to mechanically-flattening fibers which are pre-cut and fed between the rollers in random fashion, the use of a twisted or braided rope is believed to render more consistent the amount of compressive force being exerted by the rollers. The resultant exemplary flattened intertwined or interwoven fibers, when separated into separate fibers or smaller fiber clumps (which are individual fibers temporarily stuck together by the compressive flattening forces employed), are observed to have varying width and/or thickness dimensions, and are usually seen with the greatest width dimensions particularly at the locations where fiber-on-fiber compression has occurred. These locations on the fiber bodies are typically where the greatest flexibility exists, and the flattening of intertwined or interwoven fibers helps to guarantee that these locations exist in the resultant individual fibers thus produced.

The inventors believe that the increased flexibility, due to flattening at the fiber-on-fiber points, thereby increases the ability of the fibers to disperse within matrix compositions such as concrete and mortar and to minimize entanglement or "balling." It is also believed that the twisting-impression that is imprinted on the fibers can facilitate keying of the fibers with the matrix matrial (e.g., concrete) being reinforced. Moreover, the use of intertwined or interwoven precursor fibers for the flattening process can produce individual fibers, after cutting, which vary from fiber to fiber, because, at the point of the rope or chord presented at the crushing point between the rollers, the individual strands within the intertwined or interwoven bundle will have different spacial arrangements and attitudes with respect to other individual strands at that same point.

Mechanically flattened intertwined fibers are most preferred, becuase, after the cutting step, it is believed to be easier to separate the strands from the rope or chord (in contrast to the interwoven variant) into individual fibers or smaller fiber bundles. The present inventors have discovered that mechanically-flattened fibers using intertwined fiber precursors (e.g., one or more twisted monofilaments, multifilaments, ribbons, self-fibrillatable filaments, etc.) provide, when cut into a plurality of short fibers (ave length 5–100 mm) reinforcing fibers having enhanced dispersion properties. The enhanced dispersion properties can be discerned in that clumping or "balling" in the concrete or mortar is avoided or substantially reduced, while the convenience and speed of dispersing the plurality of fibers into and throughout the mixture (e.g., concrete) is increased. It has also been surprisingly found that the use of devices such as bags or bindings are not needed for introducing and dispersing fibers of the invention at high speed into a concrete or mortar mixture.

Further advantages and features of the invention are further described in detail hereinafter.

BRIEF DESCRIPTION OF EXEMPLARY DRAWINGS

An appreciation of the advantages and benefits of the invention may be more readily apprehended by considering the following written description of preferred embodiments in conjunction with the accompanying drawings, wherein FIG. 1 is a before-and-after diagram of a single polymer fiber untreated (10) and an exemplary single polymer fiber treated by a preferred method of the present invention (12);

DESCRIPTION OF PREFERRED EMBODIMENTS OF THE INVENTION

Figure 1:
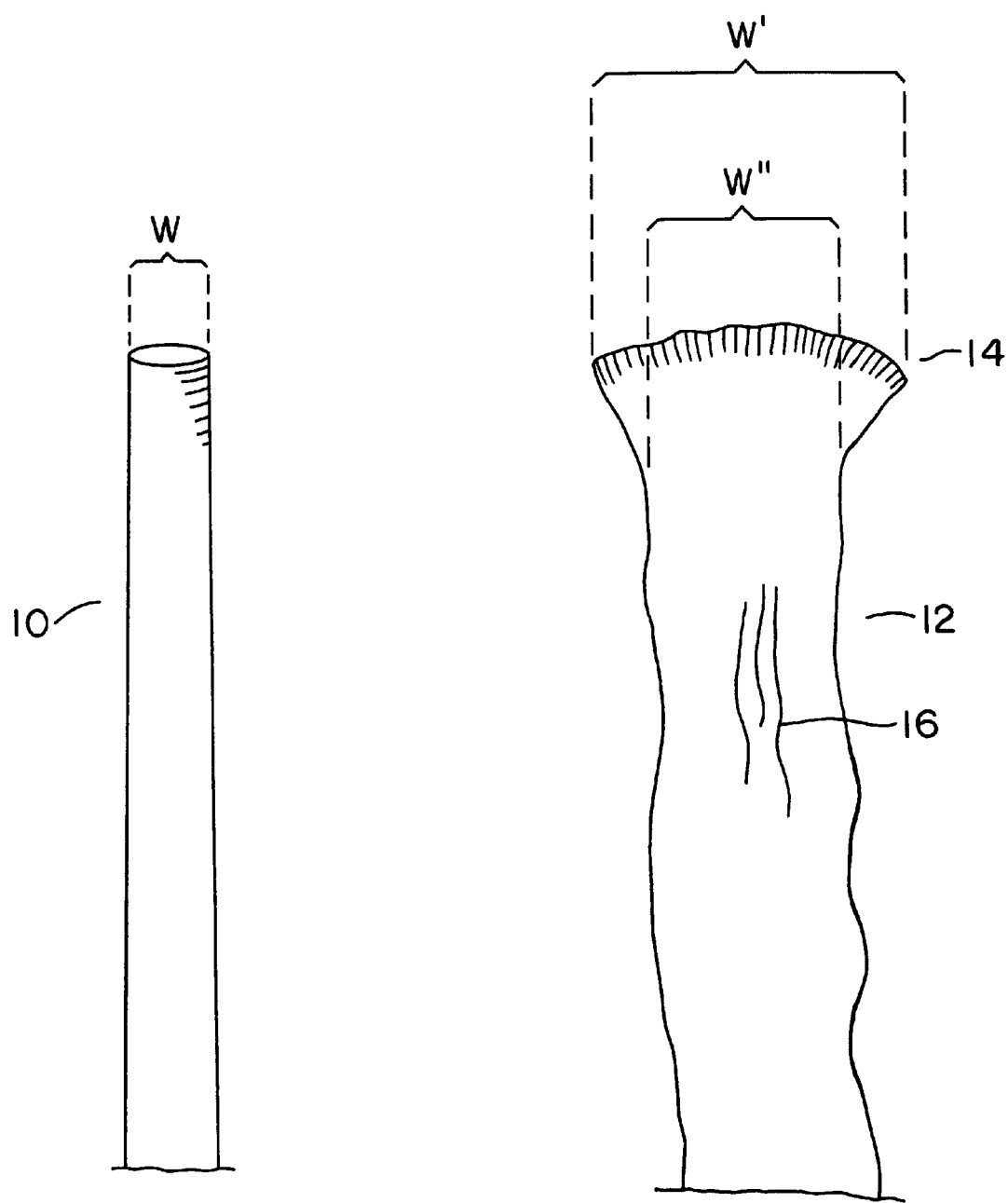

The present inventors believe that the fibers of the present invention may be used in a variety of compositions and materials and structures made from these. The term "matrix materials" therefore is intended to include a broad range of materials that can be reinforced by the fibers. These include adhesives, asphalt, composite materials (e.g., resins), plastics, elastomers such as rubber, etc. and structures made therefrom. Other matrix materials include hydratable cementitious compositions such as ready-mix concrete, precast concrete, masonry mortar and concrete, shotcrete, bituminous concrete, gypsum-based compositions (such as compositions for wallboard), gypsum-and/or Portland cement-based fireproofing compositions (for boards and spray-application), and other hydratable cementitious compositions, whether in dry or wet mix form.

A primary emphasis is placed upon the reinforcement of structural concrete (e.g., shotcrete) however since concrete (whether poured, cast, or sprayed) is an extremely brittle material which presents challenges in terms of providing reinforcing fibers which (1) can be successfully introduced into and mixed in this matrix material and (2) can provide crack-bridging bonding strength in the resultant concrete structure.

Prior to a detailed discussion of the various aforementioned drawings and further exemplary embodiments of the invention, a brief discussion of definitions will be helpful to facilitating a deeper understanding of advantages and benefits of the invention. As the fibers of the invention are envisioned for use in the paste portion of a cement or concrete (terms which are sometimes used interchangeably herein), it is helpful to discuss preliminarily the definitions of "cement" and "concrete."

The terms "paste," "mortar," and "concrete" are terms of art: pastes are mixtures composed of a hydratable cementitious binder (usually, but not exclusively, Portland cement, masonry cement, or mortar cement, and may also include limestone, hydrated lime, fly ash, blast furnace slag, pozzolans, and silica fume or other materials commonly included in such cements) and water; mortars are pastes additionally including fine aggregate (e.g., sand); and concretes are mortars additionally including coarse aggregate (e.g., gravel, stones). "Cementitious" compositions of the invention thus refer and include all of the foregoing. For example, a cementitious composition may be formed by mixing required amounts of certain materials, e.g., hydratable cementitious binder, water, and fine and/or coarse aggregate, as may be desired, with fibers as described herein.

The fibers of the present invention are preferably comprised of at least one synthetic polymer (e.g., a polyolefin) and more preferably a "multipolymer" blend which comprises two or more polymers (e.g., polypropylene and polyethylene; polypropylene and polystyrene). While exemplary fibers of the invention may comprise a single polymer such as polypropylene, the more preferred embodiments may comprise monofilaments which have two or more polymers, such as polypropylene and polyethylene, or other polymers having different moduli of elasticity. A suitable multipolymer blend fiber is disclosed, for example, in World Patent Appln. No. WO 99/46214 of J. F. Trottier et al., which is incorporated herein by reference. Exemplary fiber material is also commercially available from East Coast Rope Ltd., of Syndey, Nova Scotia, Canada, under the tradename "POLYSTEEL". Fibers which can be used in concrete, for example, includes any inorganic or organic polymer fiber which has the requisite alkaline resistance, strength, and stability for use in reinforcing hydratable cementitious structures. Synthetic polymer materials are preferred. Exemplary fibers of the invention are synthetic materials such as polyolefins, nylon, polyester, cellulose, rayons, acrylics, polyvinyl alcohol, or mixture thereof. However, polyolefins such as polypropylene and polyethylene are preferred. Polyolefins may be used in monofilament, multifilament, collated fibrillated, ribbon form, or have shapes or various sizes, dimensions, and arrays. Fibers may be coated, using the materials taught in U.S. Pat. No. 5,399,195 of Hansen (known wetting agents) or in U.S. Pat. No. 5,753,368 of Berke et al. (concrete bonding strength enhancement coatings). It is suspected by the present inventors that the use of different polymer molecular weights (e.g., a broad range) may be advantageous in helping to obtain varied width and/or thickness dimensions and a highly irregular surface morphology.

Preferred fibers are provided in "monofilament" form. The term "monofilament" refers to the shape of the treated fiber which is provided (literally) as "one filament" (ie. a unified filament). The term "monofilament" as used herein does not preclude the possibility that the singular filament may, when subjected to agitating forces within a concrete mix (e.g., one having fine and/or coarse aggregates), break down further into smaller filaments or strands when subjected to the agitation, for example, in a concrete mix due to the comminuting action of aggregates (e.g., sand, stones, or gravel). The term "monofilament" is used in contradistinction from the term "multifilament" which refers to a bunch of fibers that are intertwined together or otherwise bundled together such that they have a plurality of separate strands. (To large extent, a fiber can be defined as either monofilament or multifilament depending upon whether one is able to visually discern the separate fibrils at a certain point in time). In any event, the fibers and methods of the present invention are contemplated to include, and to be applicable to, both monofilament and multifilament fibers. The methods of the present invention are also believed to be suitable for use with fiber precursors (e.g., fibrillatable sheets), fibrillated fibers, and fibers assembled into units such as intertwined fiber bundles, rope, or braided cords which can be subjected to mechanical flattening and micro-surface deformations.

A preferred embodiment of the invention pertains to "multipolymer" fibers. It is believed by the present inventors that such fibers (having two or more different polymers, such as a mixture of polypropylene and polyethylene or a mixture of polypropylene and polystyrene, for example) provide better pull-out resistance from hydratable cementitious matrix materials (e.g., ready mix concrete). It is surmised that the different moduli of the polymers increases the chance of obtaining the variable width or thickness dimensions and surface deformations desired. Also, the use of multipolymer fibers better demonstrate the superiority of the methods of the present invention when compared to the prior art clinker-intergrinding process (taught by Vondran), because the destruction and shredding of multipolymer fibers under the prior art Vondran method is highly discernible both to the naked eye and under microscopic magnification.

Generally, the fibers of the invention may be cut into desired lengths before or after mechanical flattening. Fibers for reinforcing matrix materials preferably (after cutting) have average lengths of about 5–75 mm; average widths of 0.5–8.0 mm.; and average thicknesses of 0.005–3.0 mm. It is possible to exceed these preferred limits without straying from the spirit of the present invention. The length, width, and thickness dimensions may depend on the nature of the fiber material and use contemplated (e.g., polyolefin, carbon, polyamide, etc.) and the matrix material contemplated for reinforcement (e.g., concrete, asphalt, plastic, glass, composite material, rubber, latex, adhesive, etc.). The unique and novel morphologies of the fibers of the present invention are intended to be used over a range of fiber and matrix materials, although the greatest challenge and the predominant purpose of the present invention is to provide fibers having at least one synthetic polymer, and preferably at least two ("multipolymer") polymers blended together, for reinforcing hydratable cementitious matrix materials such as concrete.

Exemplary fibers of the present invention may be made by subjecting a plurality of fibers, or one or more fiber precursors (e.g., a polymer sheet cut or scored to provide "fibrillated" fibers, a bundle of monofilaments, continuous monofilament(s) or multifilament strands that is/are subsequently cut to the desired length, etc.) to deform the width and/or thickness dimensions, preferably to provide a macro-level keying effect through width and/or thickness dimensions that vary along the fiber length by at least 5%, more preferably by at least 10%.

FIG. 1 is an illustration of an untreated polypropylene fiber 10 when viewed under microscope. The untreated fiber 10 has an essentially uniform width dimension (w) along its entire length. When a plurality of such fibers 10 is introduced randomly between opposed rollers and flattened a few times by reintroducing the fibers randomly between the rollers, the fibers become substantially flattened 12, particularly at the opposed ends 14, where the end width (w') can be seen to be substantially greater than some of the narrow body width sections (e.g., w"). Moreover, while the untreated fiber 10 will be seen under microscope to be generally translucent, the variably flattened fiber 12 will be seen to be less translucent due to internal and superficial stresses (generally indicated by the lines drawn as at 16) which can be more readily appreciated when viewed at higher magnification.

Figure 2:
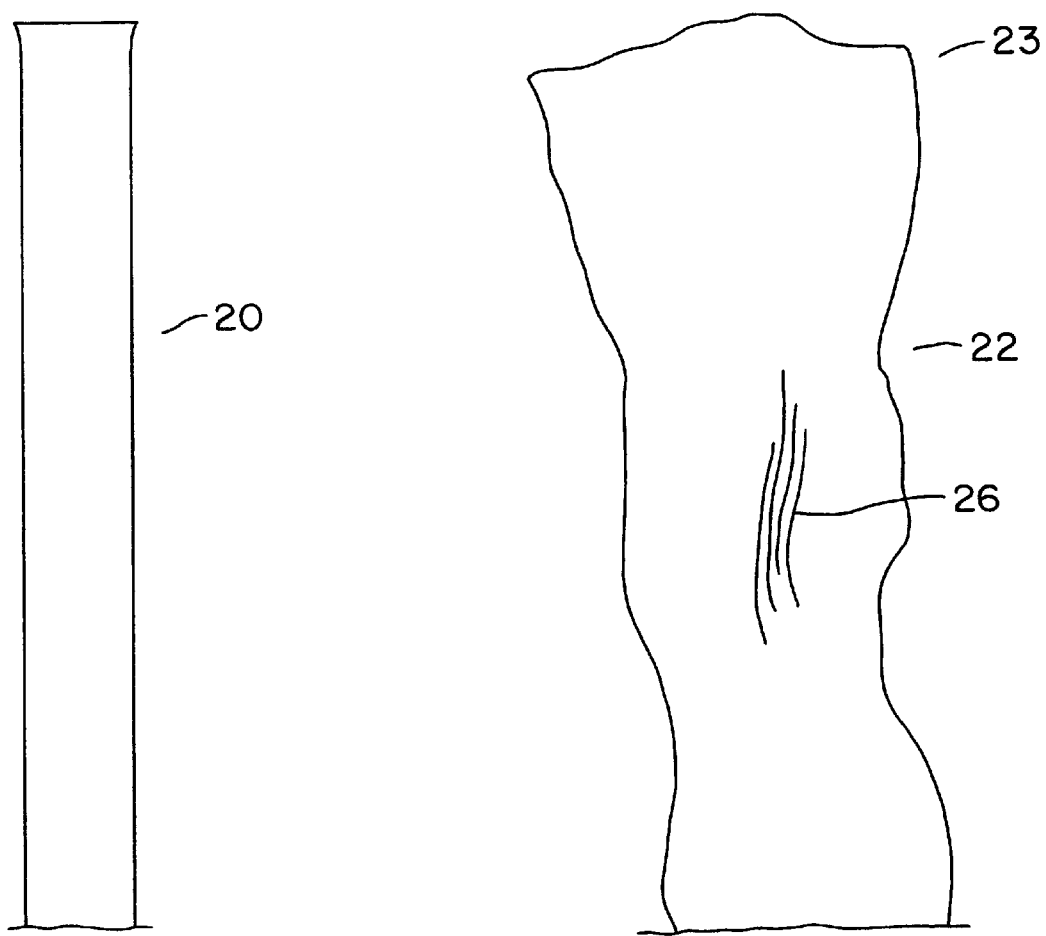
FIG. 2 is a before-and-after diagram of a multipolymer blend fiber untreated (20) and an exemplary multipolymer fiber treated by a preferred method of the present invention (22)

FIG. 2 is an illustration of an untreated multipolymer fiber 20 comprising, for example, a blend of polypropylene and polyethylene. After mechanical flattening, the flattened fiber 22 demonstrated a width increase at the fibers ends 23 and less translucence which indicated internal and superficial stresses (26).

Figure 3:
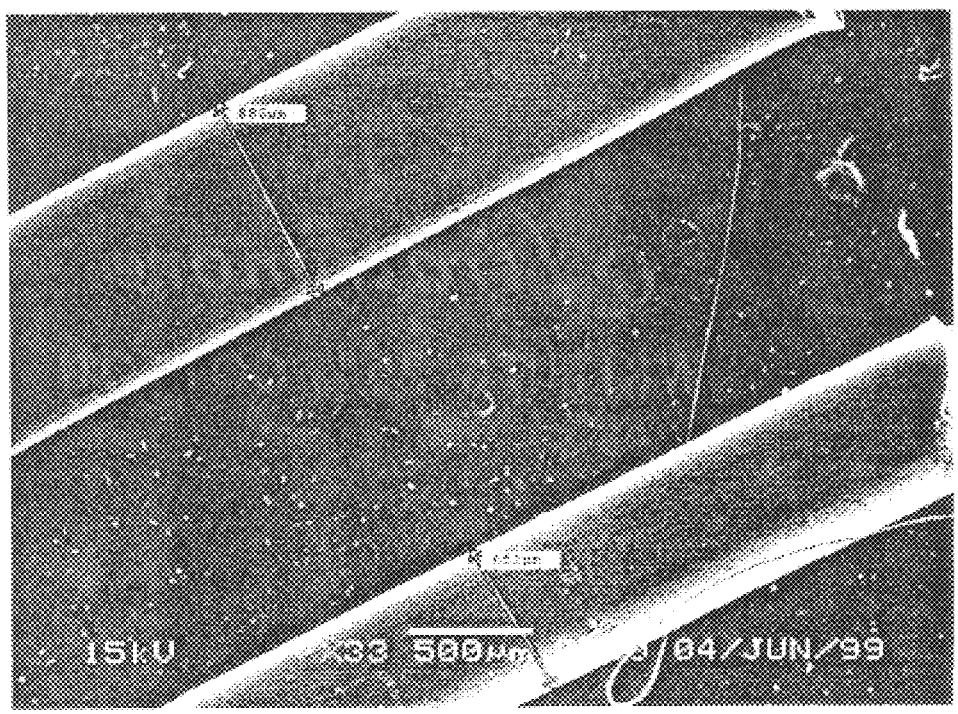
FIG. 3 is micrograph of a side view of a single polymer fiber (untreated)

FIG. 3 is a micrograph taken at 33× magnification of an untreated single polymer (polypropylene) fiber. The uniformity of width dimensions can easily be viewed.

Figure 4:
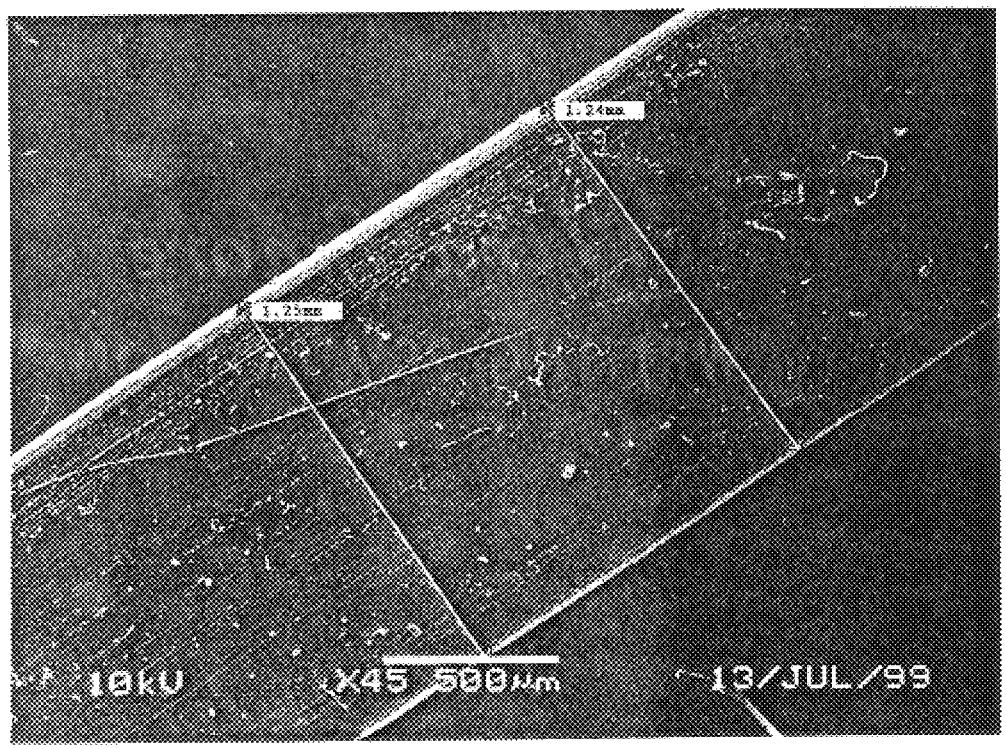
FIG. 4 is a micrograph of a side view of a multipolymer blend fiber surface (untreated)
Figure 5:
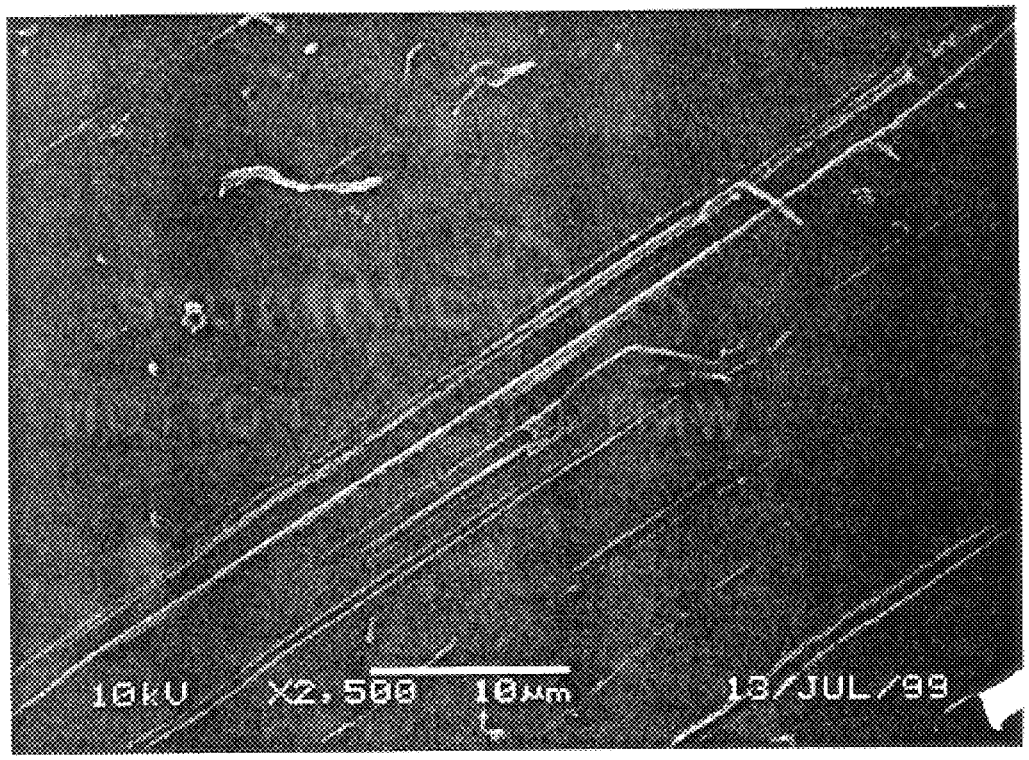
FIG. 5 is a micrograph at higher magnification of a multipolymer blend fiber surface (untreated) of FIG. 4.

FIG. 4. is a micrograph taken at 45× magnification of an untreated multipolymer blend (polypropylene/polyethylene) fiber. This also demonstrates a fairly uniform width dimension. At this magnification, slight striations in the surface can be detected, and these features are believed to be due to the effect of the extrusion die used to form the fiber. FIG. 5 is a micrograph taken at higher magnification (4500×). The striations can now be seen a small but relatively uniformly shaped grooves between relatively smooth polyblend (polypropylene/polyethylene) fiber. This also demonstrates a fairly uniform width dimension. At this magnification, slight striations in the surface can be detected, and these features are believed to be due to the effect of the extrusion die used to form the fiber. FIG. 5 is a micrograph taken at higher magnification (4500×). The striations can now be seen as small but relatively uniformly shaped grooves between relatively smooth polymer surfaces of the fiber. A large groove or channel is seen running diagonally upwards from left corner to right corner of the micrograph, and this is believed to be due to polymer separation in the multipolymer blend.

Figure 6:
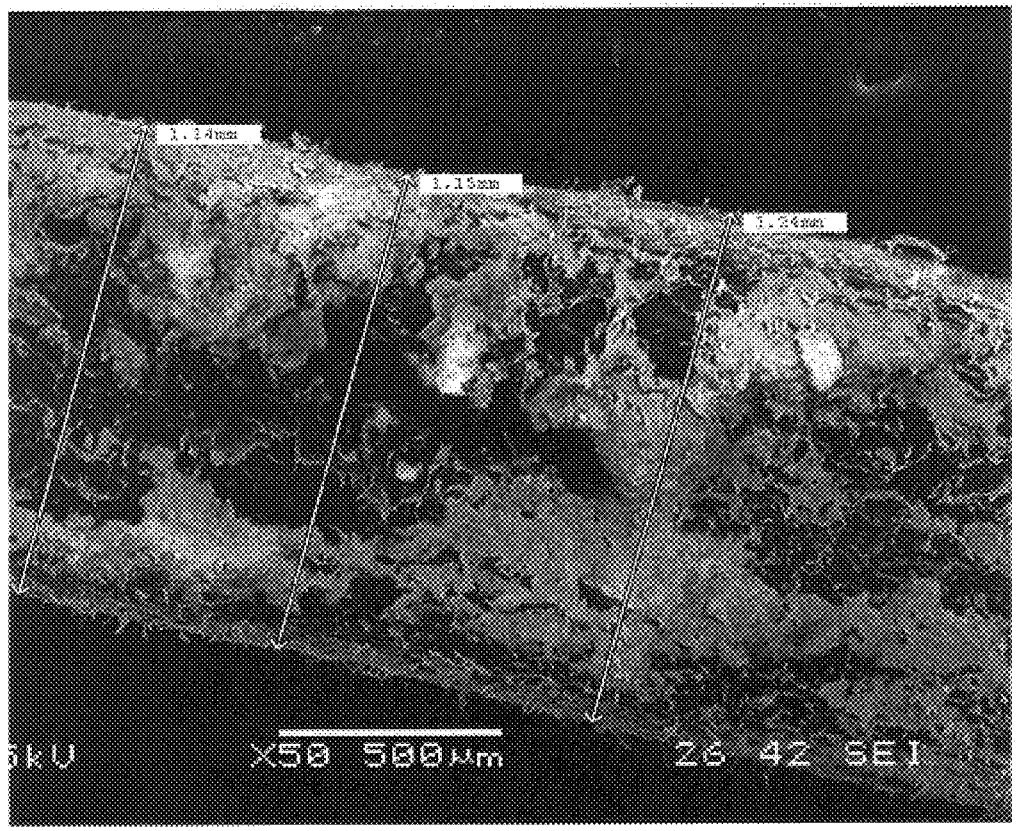
FIG. 6 is a micrograph of the surface of a single polymer fiber after intergrinding with cement clinker in a ball mill (prior art method)

FIG. 6 is a micrograph taken at 50× magnification of a polypropylene fiber subjected to intergrinding with cement clinker in a small laboratory-scale steel ball mill. This is the effect of the prior art Vondran process. The surface is embedded with cement particles (large whitish areas.) The width dimensions are not substantially varied by the ball mill clinker intergrinding. In any event, the present inventors attempted to simulate the ball mill process without the use of a ball mill as actually used in grinding cement clinker, because they do not believe that any fibers would actually be left if an actual ball mill for clinker intergrinding (i.e. actual cement manufacture) were used as taught by Vondran.

Figure 7:
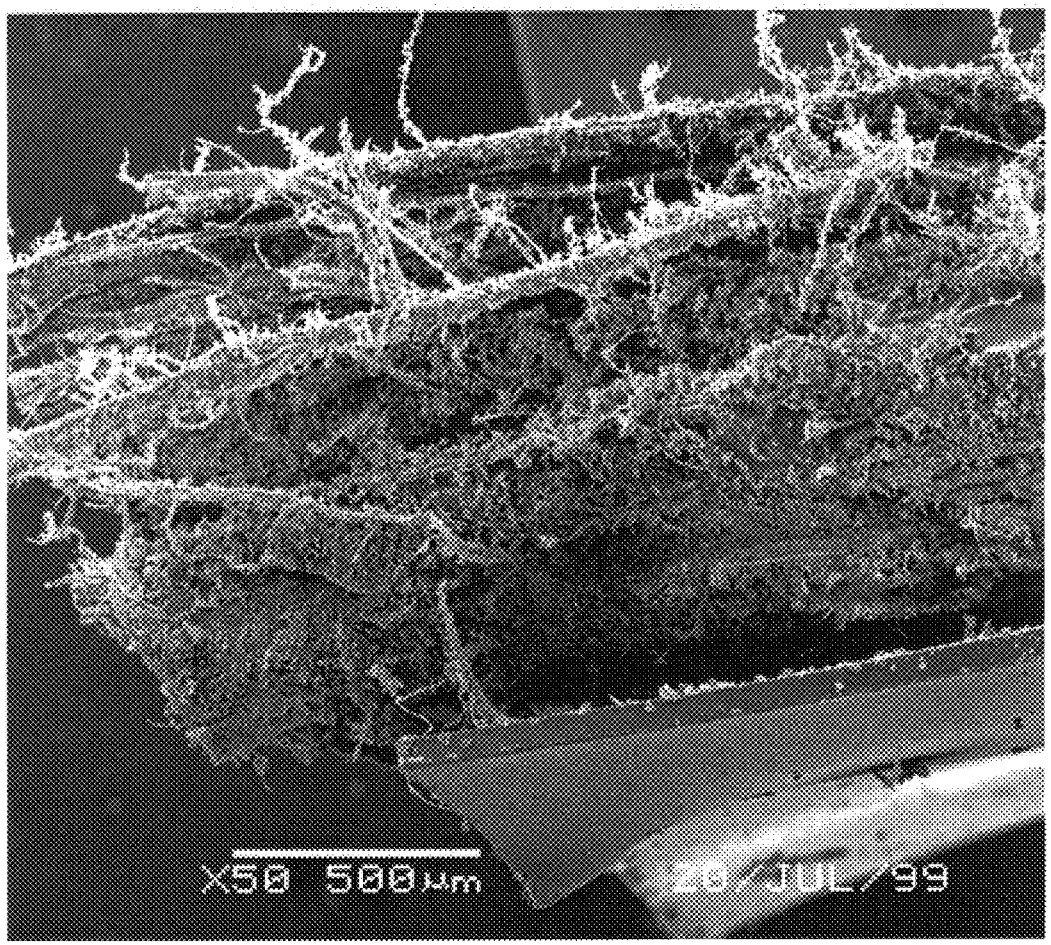
FIG. 7 is a micrograph of a shredded multipolymer blend fiber after intergrinding with cement clinker in a ball mill (prior art method)

FIG. 7 is a micrograph at 50× enlargement of a multipolymer fiber (polypropylene/polyethylene) that was subjected to the prior art Vondran clinker intergrinding process in a ball mill. The fiber was shredded and abraded by the action of the clinker material during intergrinding. (The edge of a piece of tape can be seen in the micrograph; this was used to handle the fiber during viewing). The integrity of this fiber is obliterated and rendered essentially useless for purposes of reinforcing cementitious materials. This shredded fiber would likely cause fiber-to-fiber entanglement and mixing difficulties.

Figure 8:
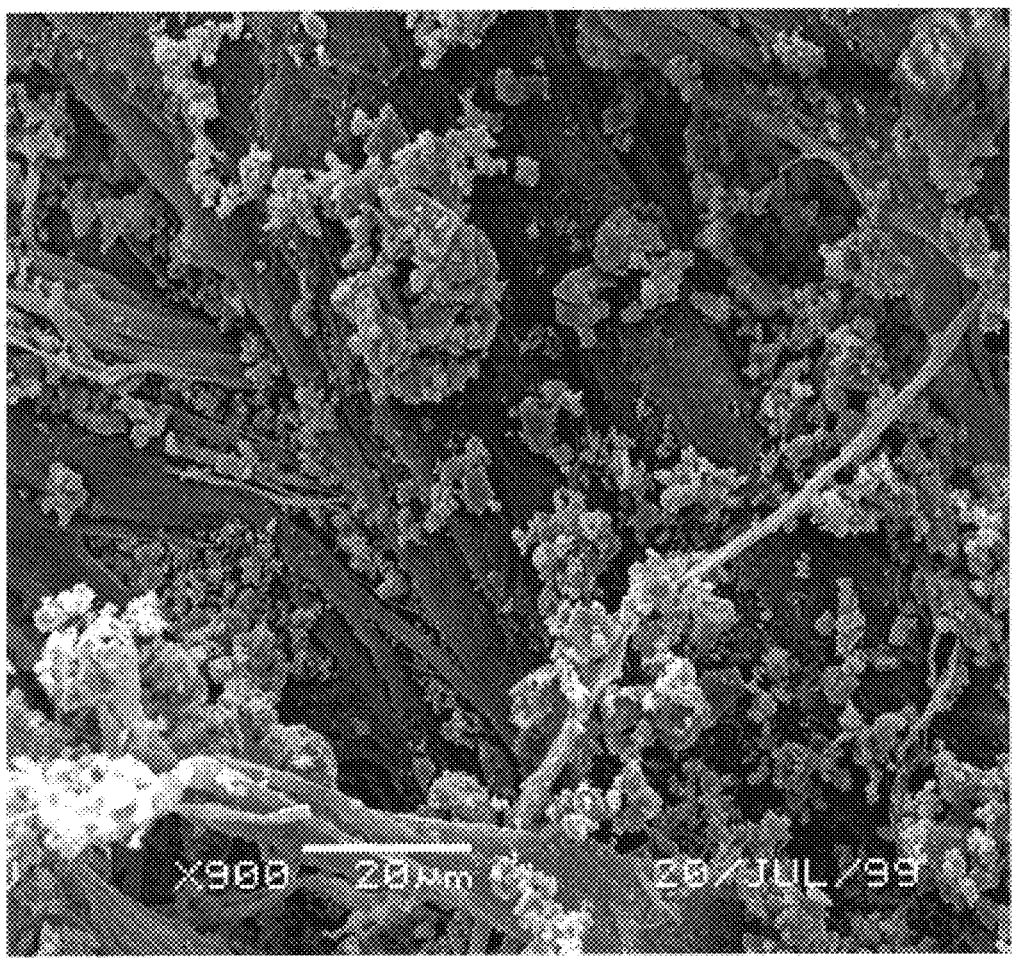
FIG. 8 is micrograph of a shredded multipolymer blend fiber surface embedded with cement particles after intergrinding with clinker in a ball mill (prior art method)

FIG. 8 is a micrograph at 900× magnification of a multipolymer fiber subjected to clinker-intergrinding. The embedded cement clinker particles can now be more readily seen embedded into the fiber surface. The nature and severity of the shredding can be more readily appreciated, because extremely tiny microfilaments (many less than 5 um) can be seen to have separated completely from adjoining fiber material, and this is believe to be an impediment to the task of reinforcing concrete.

Figure 9:
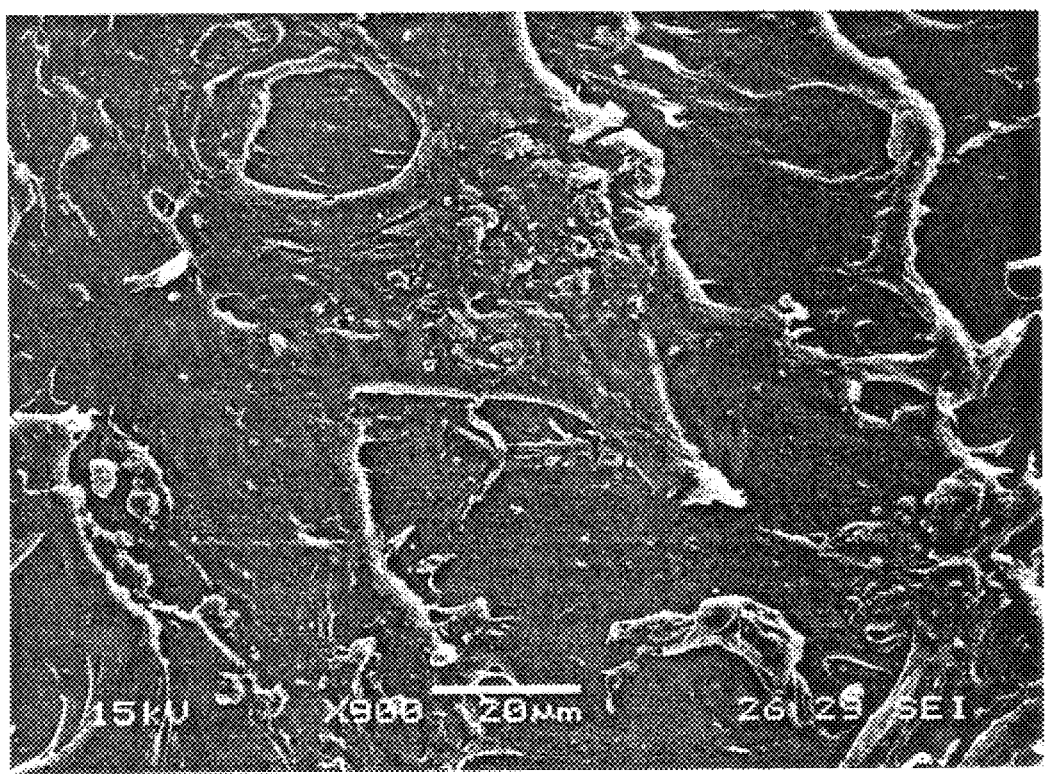
FIG. 9 is a micrograph of exemplary micro-diastrophic surface deformations of a single polymer fiber treated by the method of the present invention.

FIG. 9 is a micrograph at 900× magnification of the surface of a single polymer (e.g., polypropylene) fiber flattened in accordance with the methods of the present invention. A plurality of fibers were flattened a number of times by random introduction through opposed rollers. The fibers were compressed such that they had variable width and/or thickness dimension(s) (as will be shown later), but most significantly the fiber surfaces had micro-diastrophic features. Readily seen are elevated or raised portions, ridges, mountain-like "terrain." as well as depressions, folded strata (there is a round-shaped folding seen near the upper left corner of the micrograph), as well as irregular and random fissures or breaks in the material. This microscopic diastrophism can be seen as an increased surface area. Such micro-diastrophic change in the fibers cannot be achieved merely by placing fibers between embossed rollers to cut or roughen the surface, but can only be achieved by exerting sufficient great pressures on the fibers to achieve irregular and random displacement or dislodgment of masses of the fiber polymer material.

It is with reference to micrographs such as provided in FIG. 9 that one can sense the metaphoric or poetic appropriateness of the definition of "diastrophism" as provided in Webster's Third New International Dictionary: "the process of deformation that produces in earth's crust its continents and ocean basins, plateaus and mountains, folds of strata, and faults-." For example, the reference to "ocean basins" seems especially appropriate for the fiber surface morphology shown in FIG. 9, because the elevations and depressions of physical fiber material as shown are fluid-like in the manner of an ocean floor, or they otherwise suggest or resemble glacial erosions or shifting.

Figure 10:
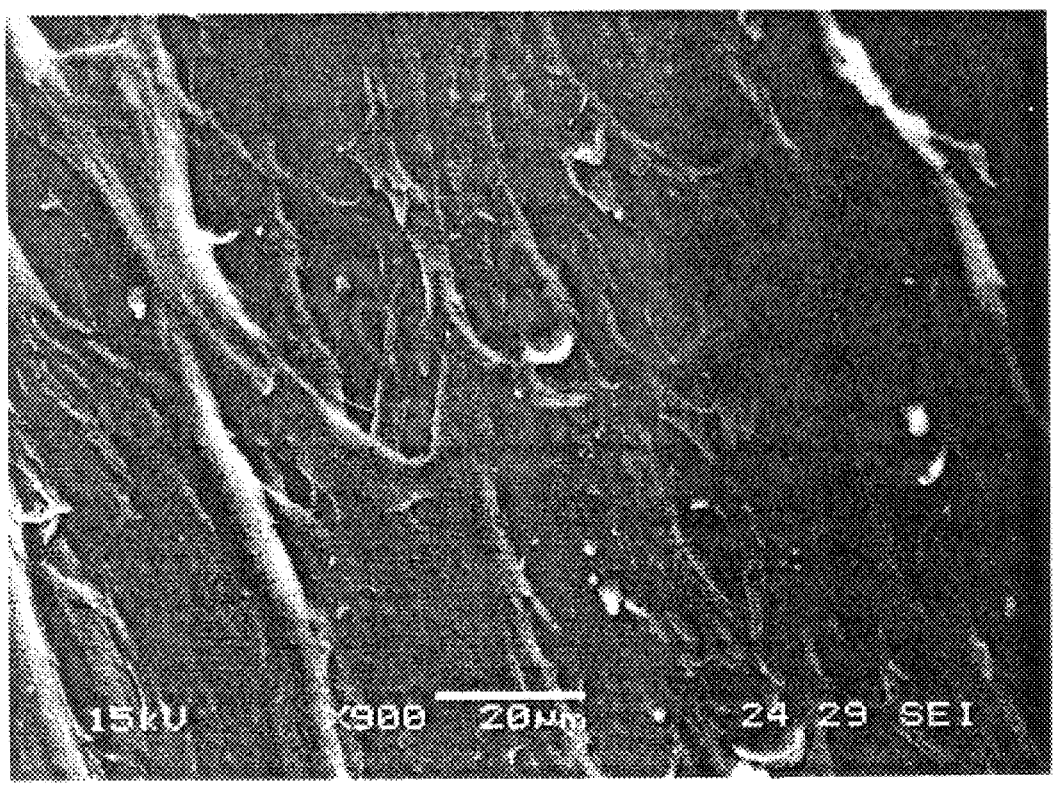
FIG. 10 is a micrograph of exemplary micro-diastrophic surface deformations of a multipolymer blend fiber treated by the method of the present invention.

FIG. 10 is a micrograph at 900× magnification of a multipolymer (polypropylene/polyethylene) blend fiber that was treated in accordance with the flattening process of the invention. The micro-diastrophism seen is also random, showing elevated peaks and depressions of fiber material. Irregular elevated ridges can be seen to span over depressions and/or fissures of discontinuous micro-fractures in the polymeric material. The polymer material can be said to be "smeared" and physically displaced by the flattening process of the invention in an irregular, non uniform manner.

Figure 11:
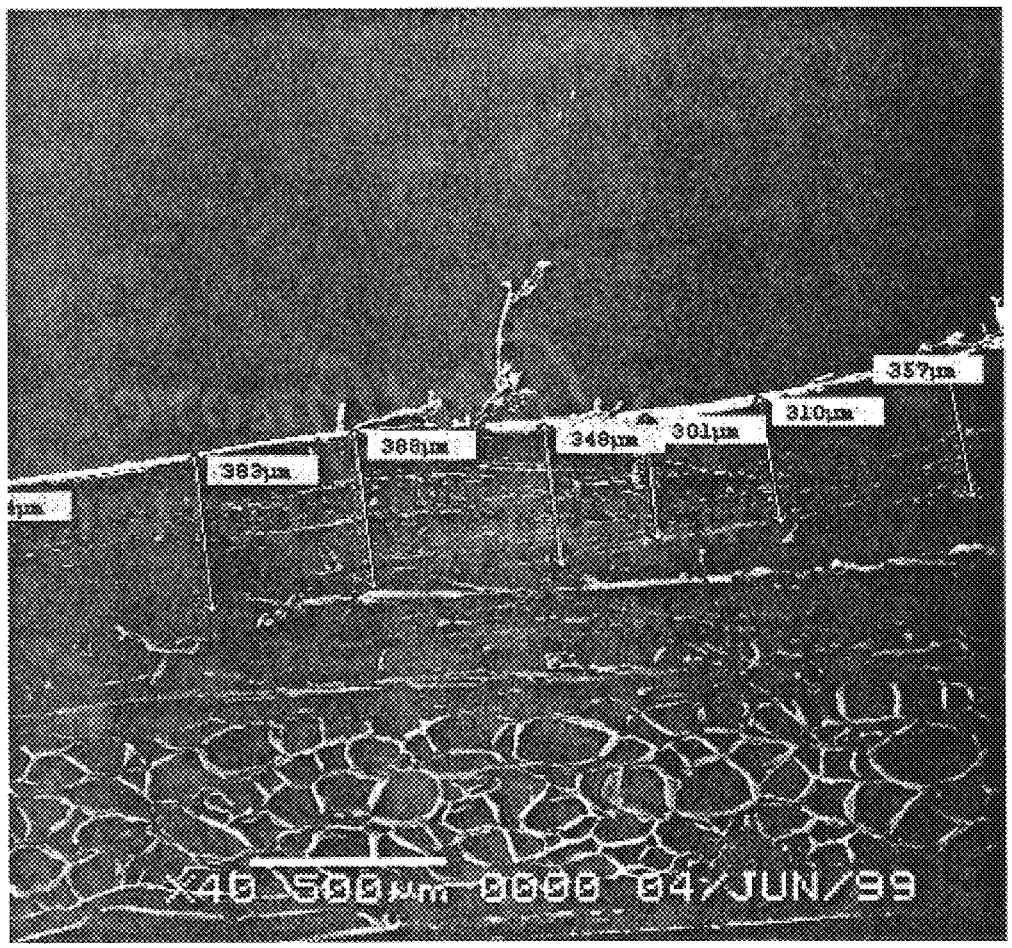
FIG. 11 is a micrograph of the edge view of an exemplary single polymer fiber (shown adjacent to open cells of adhesive mounting substrate used for handling fiber during viewing) treated by the method of the present invention.

FIG. 11 is a micrograph taken at 40× magnification of an edge view of a single polymer (polypropylene) fiber (shown adjacent to open cells of adhesive used for handling the fiber) that was flattened in accordance with the method of the present invention. The thickness dimension can easily be seen to vary along the fiber length, and the micro-diastrophic surface deformations along the edge are suggested by light reflecting off the surface edge.

Figure 12:
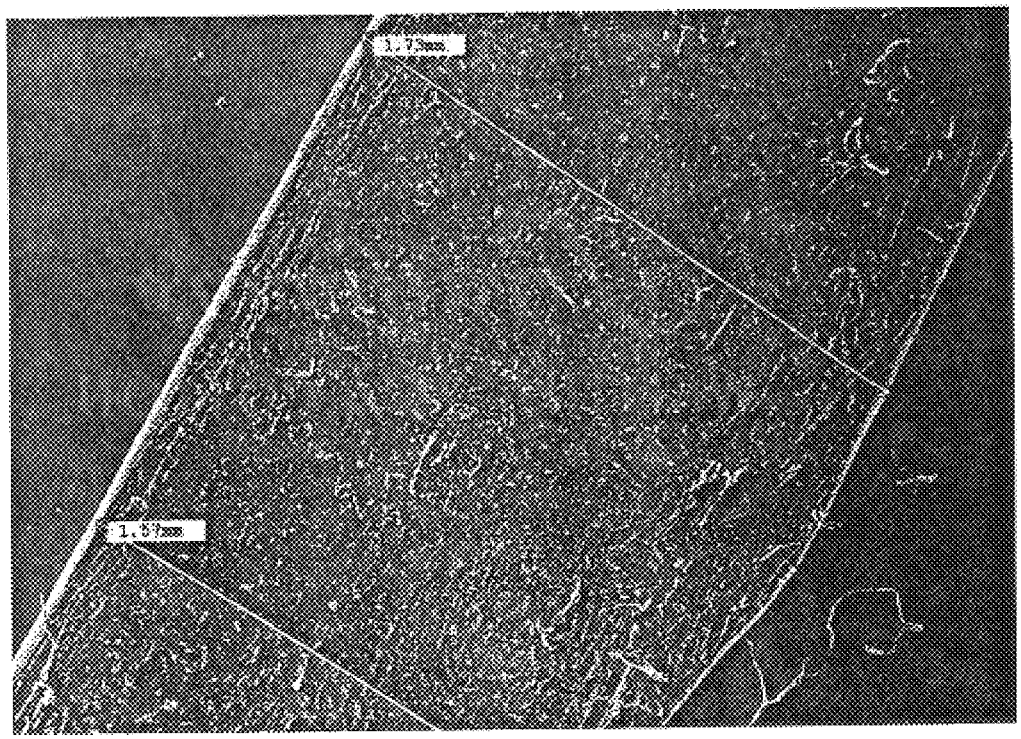
FIG. 12 is a micrograph of exemplary micro-diastrophic deformations on surface of a multipolymer blend fiber treated by the method of the present invention.

FIG. 12 is a micrograph across the width of a multipolymer blend (polypropylene/polyethylene) fiber treated by the method of the present invention. The width varied from 1.57 to 1.73 mm at one point, while the micro-diastrophic deformations of the surface could also be appreciated.

Figure 13:
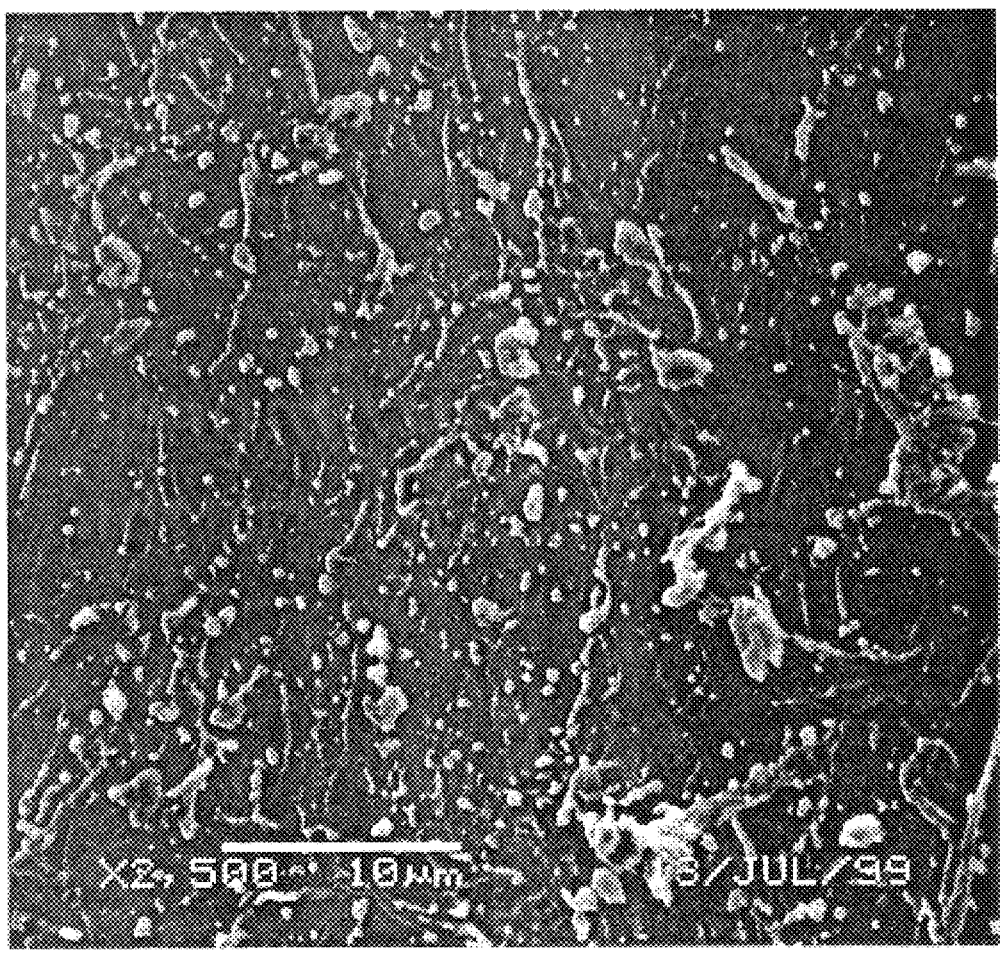
FIG. 13 is a micrograph of exemplary micro-diastrophic deformations on surface of a multipolymer blend fiber treated by the method of the present invention (tiny whitish specks are believed to be fiber polymer "dust")

FIG. 13 is a micrograph at 2,500×× magnification of a multipolymer blend fiber (polypropylene/polyethylene) treated by the flattening process of the present invention. The whitish specks (about 5 um or less) are bits of polymer from the fiber which are not believed to defeat the ability of the fiber to bond with matrix materials such as concrete, asphalt, or other materials. The micro-diastrophism can be seen to include discontinuous stress-fractures between and among areas of continuities (plateaus or ridges) of varying elevations which are shown with different shading in the micrograph of FIG. 13.

Figure 14:
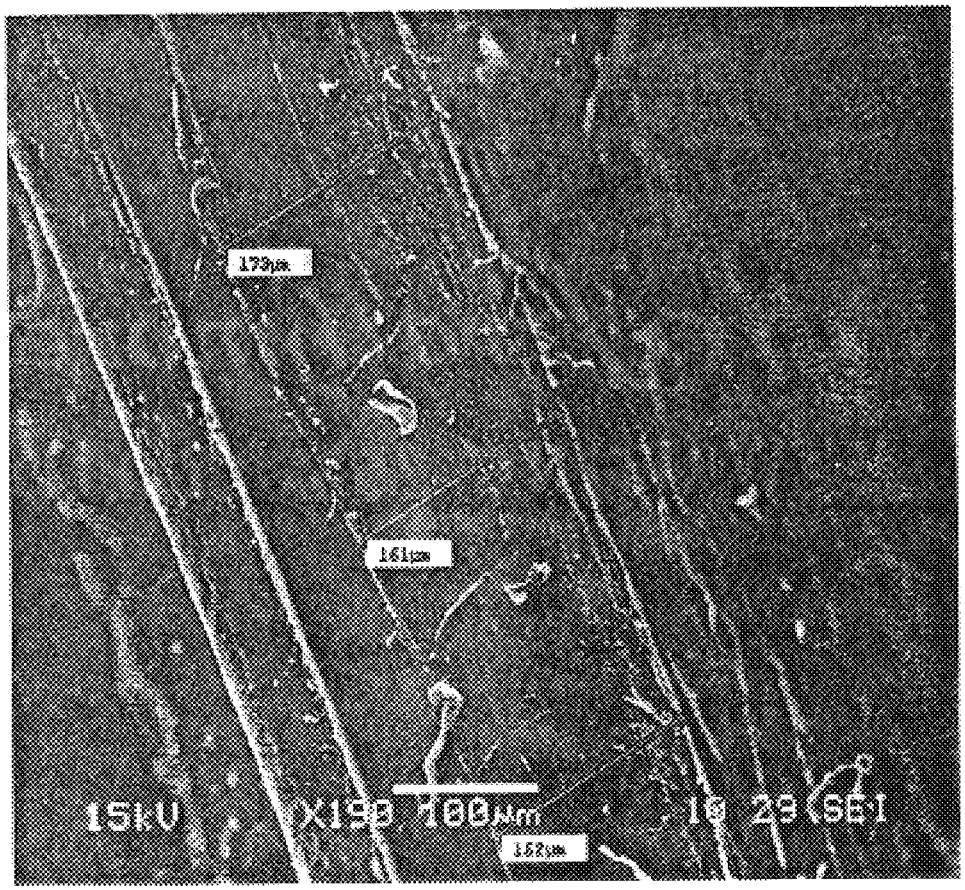
FIG. 14 is a micrograph along an edge of an exemplary multipolymer blend fiber treated by the method of the present invention.

FIG. 14 is a micrograph at 190× magnification of an edge of a multipolymer blend fiber flattened by the process of the present invention. The thickness of the fiber varied at points, from 173 um, to 161 um at another point, and to 152 um at yet another point. (A tape substrate is depicted at the left of the picture; this was used for handling the fiber). Towards the right of the micrograph, there are elevated portions of the fiber surface that are visibly evident in the distance. The surprising micro-diastrophism induced in the fiber surface (or face on the edge-to-edge side) can be especially appreciated by the micrograph of FIG. 14. Particularly remarkable is that the flattening stress force, which is applied against the fiber, induces both a noncontinuous micro-fracture (i.e., a fissure of finite length) as well as elevated ridges in the displaced polymeric fiber material.

Exemplary methods of the invention provide fibers having varying widths and/or thickness dimensions and micro-diastrophism in the fiber surface. A preferred method comprises exerting a compressive force on fibers, preferably by using the compressive action of at least one roller, and more preferably by cooperative action of opposing rollers, to compress fiber material to the point at which the fiber materials is physically displaced first on a macro-level (affecting the general shape or profile of the fiber as evident to the unaided human eye) and, second, on a micro-level whereby the microscopic fiber surface morphology is altered to include irregular and random elevated portions and "fissures" (or discontinuous stress-fractures) in the polymer material.

Preferably, at least one roller or series of rollers is/are rotated upon a stationary surface or conveying surface upon which the fiber material or fiber precursor is situated. The fiber material may be supplied in the form of continuous fibers, which may be cut after flattening, or pre-cut fiber lengths; or they may be supplied in the form of fibrillatable or scored sheets or braided or interwoven sheets, ropes, cords, etc. Thus, an exemplary method comprises introducing a plurality of cut fibers (e.g., average length of 5–75 mm) randomly between opposed rollers, such that fibers can be pressed against each other as they pass between opposed rollers. More preferably, the fibers are subjected to such flattening at least two or more times between the same rollers or other rollers. For example, fibers may be subjected to a series of opposed rollers, each roller having increasing textured surfaces for achieving microscopically sized displacement of polymer material (micro-diastrophism) on the fiber surface.

Rollers are preferably steel. As polymer synthetic fibers are generally provided having equivalent diameters (or thicknesses) of average 0.5–1.0 mm, the steel rollers may be set apart at a distance somewhat less than this (say about 0.01–0.3 mm), depending upon the nature of the fiber material, ambient temperature, and other processing conditions. An exemplary method of the invention, therefore, comprises feeding a plurality of fibers or fiber precursors, either in an uncut or cut state (e.g., average 5–75 mm), between the opposed steel rollers to provide macro-level deformation as well as micro-diastrophic deformation on the fiber surfaces.

In preferred processes, the varied widths and/or thicknesses of the fibers can be achieved by varying the distance between opposed rollers (or between roller and other contact surface between which fibers are passed); by using textured rollers whereby the texture is operative to provide a varied compressive force sufficient to achieve random physical deformation in the fiber shape; and/or by subjecting two or more overlapping fibers randomly between opposed rollers. The present inventors also believe that macro-level and micro-level deformations may be obtained in the fibers by hitting the fibers randomly, or conveying fibers in a random fashion, under hammers or other objects capable of compressing certain portions of the individual fibers with sufficient stress forces.

The inventors have also discovered other surprising ways of achieving the desired deformation morphology and micro-stress-fracturing in the fibers using rollers. One way is to alter the surface of at least one roller, such as by roughening the surface by using it to crush brittle materials, such as stone, gravel, clinker, and the like; and then subsequently introducing fibers between rotating rollers wherein at least one, and preferably two or more, of the rollers have the roughened surface. Such surface-roughened or "textured" roller surfaces should preferably have a random structure or pattern, although it is possible to have the rollers textured with a irregular or non-uniform patterns (e.g., dimples, protrusions, grid patterns, line patterns, raised portions, indentations, grooves, or a combination thereof) against which or between which (as in opposed rollers) the fibers may be (preferably randomly) compressed, deformed and/or fractured.

In still further exemplary processes of the invention, the fibers may be introduced to the deforming action of rollers more than once, or, alternatively, may be subjected to a succession of rollers (preferably with each set of rollers inducing a greater degree of deformity and/or micro-fracturing compression force).

Another process of the invention comprises conveying a continuous strand or strands of fibers between compressive force micro-diastrophic-inducing means, such as rollers or hammers, whereby the fibers are flattened along the length of the fiber, and then cutting the fiber strand or strands such that individual fibers are produced having varied widths and/or thicknesses along the individual fiber length. Less preferably, the flattening of the fibers can be accomplished by using steel balls in a rotating mill or container without clinker or cement particles being interground, and thus without subsequently having embedded cement particles on the fiber surfaces; this is less preferable, as the ability to obtain variable width and/or thickness dimensions in the individual fibers is much more difficult to control.

The present invention also includes matrix materials, such as asphalt or cementitious compositions, incorporating the exemplary fibers described herein, such as concrete compositions comprising a binder, a fine aggregate and/or coarse aggregate (and fibers). Accordingly, exemplary compositions include the fibers of the invention in a matrix material such as concrete, ready-mix concrete, masonry concrete, shotcrete, bituminous concrete, and structures made from these compositions, including foundations, walls, retaining wall segments, pipes, slabs, decks, surface coatings, and other building and civil engineering structures. Asphalt compositions containing fibers of the invention, as well as structures made from such compositions, such as roads, surfaces, decks, walks, patch materials, and the like, are also within the present invention. The compositions may be supplied in either wet or dry form. These would also include dry and wet compositions comprising shotcrete or other spray-applicable materials, such as gypsum and/or Portland cement-based fireproofing, and their coatings and coated structures.

The invention also pertains to packaged fibers wherein a plurality of the exemplary fibers described herein are packaged in average fiber lengths of 5–75 mm within a container, such as a bag, peripheral bundle wrapping, capsule, box, carton, adhesive, wetting agent, bonding agent, or other packaging means that is operative to hold the fibers together, whereby their total outer surface area is diminished to facilitate introduction of the fibers into the cement or concrete mix, and whereby their uniform dispersion within the matrix material is facilitated. When introduced into the matrix material (and subjected to agitation, water, heat, or other initiating condition therein), the packaging material can be made to dissolve, abrade, rupture, or otherwise disrupt, thereby releasing the fibers into the mix and allowing them to present a larger total surface area to become mechanically engaged with the matrix material.

In the concrete arts, a package suitable for accomplishing this is available from Grace Construction Products, Cambridge, Mass., under the registered tradename CONCRETE-READY BAG®. This packaging comprises a non-water-soluble paper. Other packaging, which may be water-soluble, such as polyvinyl alcohol, may also be employed for purposes of the present invention.

Fibers may also be bundled by using an abradable or dissolvable perimeter wrap as taught in U.S. Pat. Nos. 5,807,458 and 5,897,928 both owned by 3M of Minnesota. Alternatively, fibers may be releasably adhered together using a water-soluble adhesive or wax or other releasable inter-fiber bonding agent, such that the individual fibers may become separated and dispersed uniformly during agitation of the cement mix.

It is preferable to subject the fibers, whether in cut or uncut state, or fiber precursors (e.g., fibrillatable or scored sheets) to compressive stress forces in a dry state (although known wetting agents or surface-active agents can be used to decrease static charge) and preferably at or below ambient (room) temperature before the fibers are coated or packaged. Treatment of the fibers using the techniques of the present invention is best accomplished when the fiber material is near, at, or below room temperature to induce micro-diastrophism in the fiber material, (observable under microscope—e.g., at 5×–4000× or more magnification). In other words, at the risk of belaboring the point, if the fiber material is subjected to compressive stress when the fibers are warm (e.g., after extrusion), then the fiber material can be resiliently compressible rather than brittle and may not be caused to deform by operation of the rollers or other flattening means. Rather, after extrusion, the fibers should be allowed to cool (or otherwise should be chilled) before being subjected to compressive stresses sufficient to induce macro-level width or thickness variability as well as micro-diastrophism in the fiber surface structure.

In one exemplary method of the invention, fiber material is continuously fed (in continuous strands, although cut strands can be used) between steel rollers, whole surface is textured by prior crushing of stones and gravel, to cause flattening and varying of the width and/or thickness dimensions and further to cause the fibers have micro-diastrophism in their surfaces. The fibers may optionally be coated (such as with a conventional wetting agent, anti-static coating material, bonding agent or other coatings as may described above), before or after flattening; then they can optionally be bundled together such as by a peripheral wrap and/or interfiber bonding materials, and then optionally cut (if needed) into shorter average fiber lengths (with the average fiber length, for use with cementitious materials, preferably in the average range of 5–75 mm).

An exemplary method of the invention for making the aforementioned fibers comprises subjecting a plurality of synthetic polymer fibers to flattening forces so as to create varying width and/or thickness dimensions and to diastrophically deform the fiber surface, without substantially embedding concrete particles into such surfaces and without substantially shredding the opposing ends and elongate bodies of the fibers.

An exemplary method of the invention for modifying a matrix material, such as a cementitious composition, comprises introducing into the matrix material the above-described exemplary fibers of the invention. The fibers are preferably contained within a packaging means operative to minimize initial total surface area of the fibers and also operative, upon agitation of the material mix, to dissolve or abrade or disrupt the packaging and release the fibers into the matrix material mix.

Thus, an exemplary method for reinforcing hydratable cementitious materials comprises: adding to a cement, mortar, cement mix, or concrete mix (dry or wet), in an amount of 0.05–15% weight based on percentage volume (of total dry solids) the above-described exemplary fibers of the invention. The composition is then mixed to obtain a concrete, mortar, or paste mix in which the individual fibers are released from the packaging and homogeneously distributed within the mix. The mix is then cast into a configuration or structure. More preferably, the addition amount of fibers is 0.1–5 vol. %, and more preferably 0.5–2 vol. %, based on concrete. The term "configuration" means and refers to a foundation, a rectangular shaped slab, a wall, a block, a segment of a retaining wall, a pipe, or portion of a civil engineering structure, bridge deck, tunnel, or the like.

A preferred embodiment of the present invention comprises a plurality of fibers having the exemplary macro-level and micro-level deformations described above, which fibers are bundled (either physically or by wetting agents) and/or packages (such as in a disruptable or dissolvable container) to minimize initial total surface area of the fibers (to facilitate introduction into and dispersal of the fibers within the matrix material). Upon agitation of the material mix or by operation of the water in the mix, bundling and packaging becomes either abraded or dissolved or otherwise disrupted, thereby releasing fibers into the mix and allowing the micro-diastrophically deformed fiber surface area to contact the matrix material (e.g. concrete, shotcrete mix, gypsum wallboard material, sprayable fireproofing, etc.).

For application into a concrete matrix material, as one example, the plurality of fibers may be separately bundled and/or packaged together within bags or containers, such as Grace Concrete Ready-Bag® packaging as previously described.

Figure 15:
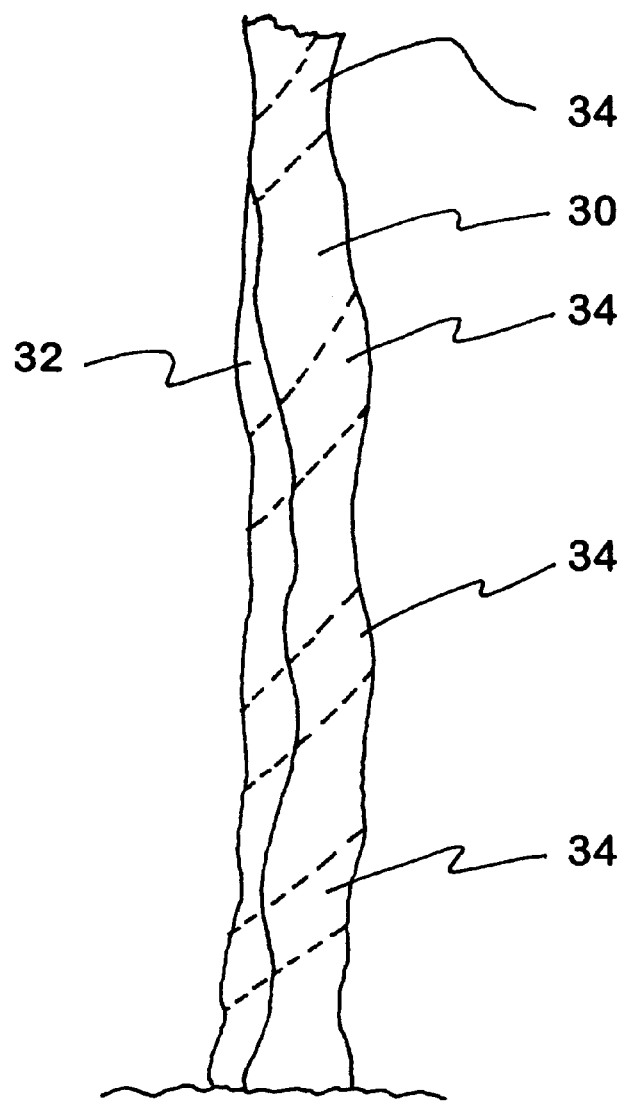
FIG. 15 is an illustration of a partial end view of further exemplary fibers of the invention having physical impression of mechanical-flattening against at least one other intertwined fiber.

Further exemplary fibers 30 and 32 of the invention are shown in FIG. 15. The force of flattening compression may cause two or more fibers to stick together temporarily (as shown in FIG. 15), but these may be separated by hand force or upon cutting or, more preferably, by agitation of the fibers within a concrete or mortar mixture. Exemplary fiber 30 has a first end (shown) and a second end (not shown) defining therebetween an intermediate elongate body portion along which are seen physical impressions, in this case depressions or channels (indicated generally within the dashed lines shown at 34, which are diagonally oriented with respect to the length of the fiber 30. The displacement of fiber material may be such that projections or ridges occur beside or between the diagonal depressions 34 (at or along or near the dashed lines). In further exemplary fibers, the individual fibers (such as 30) may demonstrate a slight widening or flattening at the diagonal impressions of intertwinement (indicated by the dashed lines 34). The number of impressions 34 and spaces between the impressions 34 may depend upon the number of turns per lineal foot of fiber strand, and this number will depend upon the user's preference as well as the number of strands per bundle treated and the type of material used (whether polymeric, metal, or combination thereof). Preferably, the depressions or projections will have a diagonal orientation in the range of 15–75°, and more preferably 30–60°, with respect to the length of the fiber body (or the imaginary line extending between the first and second opposed ends of the fiber).

Optionally, but preferably, fibers are intertwined or braided into a rope and fed between rollers to crush them, using sufficient compressive force such that some of the fibers, after cutting, will stick together (such as illustrated in FIG. 15). Exemplary fibers 30 and 32 are illustrated as being temporarily stuck together, but can be dislodged from each other by hand pressure, or more preferably by the force of agitation in a wet concrete or mortar mix. The exemplary two fibers 30/32 also illustrate another preferred embodiment wherein adjacent fiber strands cut from a mechanically-flattened twisted or braided rope can have physical impressions of intertwinement or interweaving which correspond to markings on adjacent fibers but which are not identical, such as the dashed lines 34 which appear across both fibers 30 and 32 but at different points on those fibers. Thus, for example, the physical impressions of fiber intertwinement (or interweaving) can correspond on adjacent fibers (30 and 32) but not be identical. Thus, it is believed by the inventors that the mechanical-flattening of intertwined or interwoven fibers helps to make the fiber-to-fiber treatment more consistent than would occur if pre-cut fibers were flattened in random fashion between rollers.

In further embodiments, the mechanical-flattening process can be applied to a rope of intertwined fiber bundles, each bundle of which may in turn comprise smaller ropes of intertwined or braided fiber bundles. This may be particularly advantageous for processing steel cables or nylon cables, for example, which after flattening and cutting can then provide smaller intertwined or braided fiber pieces or bundles. Thus, one embodiment of the invention comprises a plurality of fiber bundles, preferably made of steel (or polymer, multipolymers), each bundle comprising flattened intertwined or interwoven fibers.

In other words, a further embodiment comprises a large fiber bundle that may be composed of a flattened twisted-together assemblage (cable) of smaller twisted or braided bundles (ropes), which optionally may be further unravelled to provide separate fiber strands. For example, steel cable is commercially available in the form of seven twisted bundles each consisting of seven twisted individual steel fiber strands. This cable can be flattened between rollers and made to unravel into the smaller flattened ropes that, after cutting, may serve as reinforcing fiber bundles for cementitious materials.

Moreover, the inventors also envisage that ropes and cables, whether made of polymer or steel, can be purchased having the arrangement of bundling, number of fibers, gauge of fibers, number of twists per lineal foot, fiber profiles, and other characteristics provided in accordance with one's specifications, and these ropes or cables can then be mechanically-flattened and cut to provide reinforcing fibers or fiber bundles having the desired properties.

In further exemplary flattened-intertwined or flattened-interwoven embodiments of the invention, a fiber coating material may be employed to facilitate the releasable-adhering together of individual cut fibers. The coating material may be chosen from conventional wetting agents known in the fiber treatment prior art or, alternatively, the bond enhancing agent previously described hereinabove. Thus, an exemplary fiber system of the invention comprises a mechanically-flattened intertwined or interwoven fiber bundle having two or more releasably-adhered together fibers each having a physical impression of flattened intertwinement or flattened interweaving with at least one other fiber in the bundle. Preferably, though optionally, the fibers comprise a wetting agent, a bond enhancing agent, or mixture thereof. Also preferably, though optionally, the fibers have a micro-diastrophic surface as described elsewhere herein.

In still further embodiments, an intertwined or braided rope or cable of fibers can be dipped into materials to coat the fibers. The materials may include wax, paraffin, latex paint, a soluble material (e.g., PVOH), an alkali-soluble material (ie., operative to dissolve at high alkalinity typical of concrete environments), or other materials capable of dissolving and/or mechanically disintegrating upon agitation in wet concrete or mortar mix. The coating is preferably applied after the rope or cable is flattened, and preferably before the flattened rope or cable is cut into individual sections. Preferably, what one obtains is a sectioned portion of the twisted rope that may be introduced directly into wet concrete or mortar as an aggregated unit (held together temporarily by the coating) and, upon agitation in the concrete or mortar, is operative to separate by dissolution or disintegration of the coating material into the consistuent fibers or smaller bundles of fibers.

EXAMPLE 1

Comparative Physical Data

The present inventors do not believe that polymer fibers subjected to the Vondran method, employing clinker in an actual industry cement manufacturing ball mill, would have any residual integrity, but would be obliterated after intergrinding. Thus, they attempted to reproduce in their laboratory an intergrinding process that would leave a fiber with some semblance of its form, for comparative purposes. The ball used had a one cubic foot capacity and was loaded with about 22700 grams weight of steel balls having diameters between 12 and 17 mm on average and about 2400 grams total weight of cement clinker having diameters between 0.01 and 0.1 mm. About 100 grams of fibers was loaded into the mill, which was then operated at 45 revolutions per minute for a period of 30 minutes.

Polypropylene fibers available from 3M and multipolymer (e.g., polypropylene/polyethylene) blend fibers available from Grace Construction Products were used. Such multipolymer fibers are generally commercially available. The micrographs of these fibers (untreated) were provided in FIGS. 3 and 4, respectively.

If the ball mill operation is run for a period of time that is less than what is required for grinding clinker into cement, the results may be typified by FIG. 4a, which shows the ends of the interground fiber substantially shredded apart. The inventors even attempted to repeat the ball mill intergrinding operation using cement particles alone without clinker, but the fibers were also severely damaged and contained embedded cement particles. Micrographs of fibers, when treated by the cement clinker intergrinding ball mill method, were provided in FIGS. 6 and 8 (single polymer) and FIG. 7 (multipolymer).

As seen in the micrographs of FIGS. 7 and 8, when fibers were interground with clinker in a ball mill, the fiber surfaces are abraded and embedded with cement clinker. As shown in FIG. 8, in particular, the fiber is shredded to the point at which the fiber integrity is essentially destroyed.

EXAMPLE 2

Micrographs of fibers treated by exemplary flattening methods of the present invention are provided in FIGS. 9–14. The surfaces contain micro-diastrophic material displacements and contain no embedded clinker and have no substantial shredding (e.g., complete separation of fibrils or strands that destroys the physical integrity of the fiber). The fibers were treated by introducing a plurality of fibers randomly, often overlapping one another, between opposed steel cylinders which were spaced apart a distance that was less than the fiber thickness, such that physical flattening occurred in the general shape of the fiber and micro-diastrophism occurred on the surface of the fibers. It is believed that the distance between opposed rollers was about 10%–50% the average diameter dimension of the fibers. The macro-level and micro-level deformations perceived were especially pronounced when a multipolymer blend fiber (Grace Structural Fiber) was subjected to the method of the present invention, and passed between the rollers at least two or three times.

It is surmised by the inventors that the various surface portions of fibers treated by the flattening method of the present invention will demonstrate fractal geometry in the sense that the irregular and random micro-level-deformities (micro-diastrophism) will appear at increasingly higher magnifications of the surface.

The present invention is not to be limited by the foregoing examples which are provided for illustrative purposes only.

It is claimed:

1. A method for treating fibers, comprising: introducing an intertwined or braided plurality of fibers between a pair of rollers to flatten the fibers, the fibers thereby having having irregular and random displacements of polymer material on their individual surfaces, said fiber surface displacements comprising microscopic noncontinuous stress fractures and microscopic elevated ridges, said fibers being mechanically flattened while intertwined or braided together in an assemblage such that a portion of said fibers bear a physical impression of another fiber, said plurality of fibers being operative, when admixed into a matrix composition, of separating apart from intertwined or braided assemblage and into individual fiber bodies dispersible with the matrix composition to be reinforced.

2. The method of claim 1 wherein said fibers are intertwined.

3. The method of claim 1 wherein said fibers are braided.

4. The method of claim 2 further comprising cutting said intertwined fibers after flattening, thereby providing flattened fibers having a physical impression of at least one other fiber intertwined and flattened against them.

5. The method of claim 1 wherein said fibers comprise at least one synthetic polymer, at least one metal, or a combination thereof.

6. The method of claim 1 wherein said fibers are coated.

7. The method of claim 2 wherein said flattering provides a micro-diastrophic surface on the flattened fibers.

8. The method of claim 1 wherein, in said step of introducing intertwined or braided fibers between said rollers, said fibers are introduced as an intertwined rope comprising further smaller intertwined or braided fiber bundles.

* * * * *